United States Patent [19]

Kladder et al.

[11] Patent Number: 5,215,574
[45] Date of Patent: Jun. 1, 1993

[54] METHOD OF IMPROVING PRECIOUS METAL YIELD IN A MERRILL-CROWE RECOVERY PROCESS

[75] Inventors: Suzanne L. Kladder, Colorado Springs, Colo.; Terrence W. Mattioli, King of Prussia; Gary E. Geiger, Richboro, both of Pa.; James E. Cressman, Alamosa, Colo.

[73] Assignee: Betz Laboratories, Inc., Trevose, Pa.

[21] Appl. No.: 816,997

[22] Filed: Jan. 3, 1992

[51] Int. Cl.5 .............................................. C22B 3/46
[52] U.S. Cl. ....................................... 75/735; 75/737; 423/29
[58] Field of Search .................... 75/735, 737; 423/29, 423/30, 31, 24

[56] References Cited

U.S. PATENT DOCUMENTS

| | | | |
|---|---|---|---|
| 3,033,675 | 5/1962 | Hedley | 75/737 |
| 4,701,262 | 10/1987 | Chen | 210/699 |
| 5,061,459 | 10/1991 | Bennett et al. | 423/29 |

OTHER PUBLICATIONS

"Development of a New Process to Control Scale In the Strip Circuit at the Homestake McLaughlin Mine", Society for Mining, Metallurgy & Exploration, Inc. Preprint No. 90-15 1990.

"Computer Controlled Merrill-Crowe Processing", R. M. van Zyl, Engineering and Mining Journal, Apr. 1983.

*Primary Examiner*—Melvyn J. Andrews
*Attorney, Agent, or Firm*—Alexander D. Ricci; Steven D. Boyd

[57] ABSTRACT

A method for improving the yield of gold and silver from a Merrill-Crowe recovery process where the presence of copper effects yield. The method involves the addition of a substoichiometric amount of ethylenediaminetetraacetic acid in combination with a phosphonate and polyacrylic copolymer scale control agent. The method also reduces zinc consumption and controls scaling in the stripping circuit.

2 Claims, No Drawings

METHOD OF IMPROVING PRECIOUS METAL YIELD IN A MERRILL-CROWE RECOVERY PROCESS

BACKGROUND OF THE INVENTION

The recovery of precious metals, primarily gold and silver, from low grade tailings or dump ore has been known for many years. Typically, the low grade ore is crushed to a uniform size then agglomerated prior to construction into heaps. The heaps are constructed upon impervious leach pads. A leach solution such as sodium cyanide is sprayed onto the heaps and allowed to percolate through the heaps. The percolating leachate dissolves metals such as gold, silver, copper, etc., in the heap. The pregnant leach solution is collected and the gold and silver recovered via a zinc precipitation Merrill-Crowe process or via a carbon adsorption/desorption process. In the activated carbon desorption process the gold is stripped from the carbon by increasing the temperature, cyanide concentration and pH of the pregnant solution. The pregnant stripper solution is recirculated through either an electrowinning circuit to recover gold on a steel wool electrode or through a Merrill-Crowe circuit to recover gold precipitate as a filter cake.

In the use of zinc precipitation of metals from such cyanide solutions, it is essential that the solution be clarified to approximately 5 ppm solids or less, and deaerated to about 1 ppm oxygen. There must be adequate zinc, an appropriate portion of lead nitrate, sufficient free cyanide, proper solution pH's and an appropriate filter media such as diatomaceous earth.

The cyanide solution will dissolve other metals in addition to the gold and silver sought in such mining operations Copper and calcium as well as others may be dissolved by the leach solution and result in a decreased overall yield of gold and silver. Calcium and other scale forming metals can result in scale formation on the stripping circuit heat transfer surfaces or in the filter presses of a Merrill-Crowe recovery process.

The use of chelation chemistry to inhibit scale deposition is known. To alleviate scale deposition many commercial antiscalants are available. These include maleic polymers, acrylic polymers, phosphonates and combinations thereof. Anti-scalant agents comprising chelating agents and organic dispersants have also been employed. Such antiscalants sequester calcium and render it non-reactive thus reducing scale deposition. The organic dispersants keep previously formed scale crystals free-flowing. The chemistry of chelation is well known as are common chelating agents such as ethylenediaminetetra acetic acid, nitrilotriacetic acid and hydroxyethylethylenediaminetriacetic acid. The reaction of chelation is a stoichiometric reaction. Chelating agents will complex certain metallic ions preferentially to others.

The chelation constant $K_{ma}$ predicts the strength of the metal - ligand complex which forms. The most strongly complexed ion is chelated before the next most strongly complexed ion is chelated. Thus, when a number of species are present which will be chelated by the chosen scale control additive, the stoichiometric amount of scale control agent required may be excessive.

Many copper oxide and sulfide minerals are quite soluble in cyanide solutions. Copper forms several cyano complexes and the cyanide in these complexes is unavailable for gold dissolution. However, much of it reports as a free cyanide when the leach solution is analyzed by the standard silver nitrate titration procedure. This means that a solution which apparently contains a sufficiency of free cyanide for gold recovery may in fact give incomplete gold dissolution.

Copper also causes a decrease in the yield of gold and silver because it precipitates, along with gold and silver, when powdered zinc is added to the pregnant solution. Thus copper will dilute the dore bullion. Copper will also increase cyanide consumption.

Because, of these undesirable effects caused by the presence of copper, ore containing more than about 0.3% copper is often treated as gold containing copper ore. The copper is floated into a concentrate and the neutralized flotation tails cyanided to recover the gold.

In gold ores where the amount of copper is not sufficient to justify the recovery of copper, the copper is not recovered separate from gold and silver and decreases the overall yield of gold and silver in the dore bullion.

SUMMARY OF THE INVENTION

The inventors of the present invention have discovered that the addition of a threshold (substoichiometric) amount of ethylene-diaminetetraacetic acid (EDTA) in combination with a scale control agent resulted in an increase in the percent of gold and silver in the dore bar in a Merrill-Crowe recovery process. The increase was the result of a decrease in the amount of copper which precipitated and was recovered by the process. The decrease in the amount of copper precipitated also allowed the amount of zinc powder necessary in the precipitation step to be decreased, further improving the efficacy of the recovery operation.

DESCRIPTION OF THE PREFERRED EMBODIMENT

The present invention is directed to a composition or combination of products for use in the recovery of gold, silver or other metals from metal bearing ore by the Merrill-Crowe recovery process. The composition includes a phosphonate, a polyacrylate copolymer and EDTA. It was discovered that the combination of the present invention effectively increases the yield of gold and silver while decreasing scale deposition in the stripper circuit in a Merrill-Crowe recovery process. In a stripper circuit gold is desorbed from activated carbon, followed by precipitation by zinc powder. The combination of the present invention also allows for a decrease in the amount of zinc powder employed in the precipitation segment of a Merrill-Crowe recovery process. The combination of the present invention was found to be effective in the processing of metal bearing ore which contained sufficient copper to adversely effect the yield of gold and silver recovered.

The Merrill-Crowe precipitation process is a gold and silver recovery process wherein zinc is employed to precipitate gold and silver from a cyanide solution. The process is typically employed to recover gold and silver from a pregnant leach solution. In the process, zinc dust is added to the pregnant leach solution to effect precipitation. The pregnant leach solution is typically filtered through diatomaceous earth to filter and clarify the incoming solution. The filter removes fine clays, sands and other foreign particles. The pregnant leach solution is then deoxygenated in a vacuum deaeration tower. Thereafter zinc powder, usually in combination with lead salts such as lead nitrate are added to the pregnant solution to precipitate gold and silver. Copper which is often present in the pregnant solution may also precipitate. High pH (10.0 plus) may be employed in an attempt to minimize the precipitation of copper. However, some copper will precipitate with the gold and silver thereby decreasing the percentage of gold and silver in the recovered dore bullion. The precipitate and solution are filtered through diatomaceous earth in plate and frame filter presses to recover the precipitated material. The filter cake is dried, acid leached to remove zinc and refined in a smelter to recover a dore bar of gold, silver and copper.

It was discovered by the present inventors that the addition of the combination of the present invention to the pregnant leach solution in the metal stripping circuit provides, in addition to reduced in scale deposition, a decrease in percent copper and resulted in an increase in the percent of gold and silver in the dore bar while allowing the amount of zinc dust added to be decreased. The control of scale by the combination of the present invention was expected, the phosphonate and polyacrylate copolymer materials are known calcium scale control agents. See U.S. Pat. No. 4,701,262 incorporated herein by reference. However, the apparent control of copper was unexpected at the substoichiometric (with respect to copper) EDTA treatment levels of the present invention. Further, the decrease in zinc powder added was expected to adversely effect the gold and silver recovery especially in an ore containing copper.

The present invention will now be further described with reference to a specific example which is to be regarded solely as illustrative, and not as restricting the scope of the present invention.

The combination of the present invention was fed to the gold and silver stripping circuit of a working gold mine which employed an activated carbon adsorption/desorption process in conjunction with a Merrill-Crowe precious metal recovery process. The solution of the present invention was fed at several points in the strip circuit to prevent equipment scaling at critical points. The solution fed to the stripping circuit consisted of EDTA (38% concentration) fed to the zinc powder feed cone in an amount sufficient to provide a concentration of about 17 parts per million. EDTA was also shot fed to the barren leachate storage tank when the strip solution was changed in an amount sufficient to provide a concentration of about 1000 parts per million. The phosphonate and the polyacrylate copolymer component of the present invention comprising phosphono butane tricarboxylic acid and acrylic acid/acrylic hydroxypropyl sulfonate was fed to the barren leach storage tank to provide a concentration of 66 ppm, to the pregnant leach solution holding tank to provide a concentration of about 29 ppm and to the zinc powder feed cone to provide a concentration of about 37 ppm. The phosphonate and polyacrylate copolymer was fed as a 26% (10.5 active) aqueous solution.

As a result of the feeding of the solution of the present invention, the percent gold and silver in the dore bullion recovered changed from a range of 29.2 to 65.1% (average 49.8%) to a range of from 53.0 to 84.7% (an average of 68.2%). This increase in gold and silver concentration in the dore bullion was accomplished with a zinc powder feed reduction of 50% and was accompanied by a reduction in quantity and tenacity of scale deposits in the stripping circuit. See Tables 1 and 2.

TABLE 1

| Percent Gold and Silver in Dore Bullion No Treatment | |
|---|---|
| Bar Number | Percent Gold and Silver |
| 1 | 56.3 |
| 2 | 61.2 |
| 3 | 57.2 |
| 4 | 40.9 |
| 5 | 65.1 |
| 6 | 60.4 |
| 7 | 55.4 |
| 8 | 59.9 |
| 9 | 42.1 |
| 10 | 51 |
| 11 | 42.4 |
| 12 | 29.2 |
| 13 | 47.2 |
| 14 | 48.2 |
| 15 | 40.8 |
| 16 | 43.3 |
| 17 | 57.5 |
| 18 | 57.5 |
| 19 | 48.2 |
| 20 | 52.3 |
| 21 | 47.2 |
| 22 | 44.3 |
| 23 | 39.7 |
| Average: | 49.8% |

TABLE 2

| Percent Gold and Silver in Dore Bullion After Treatment | |
|---|---|
| Bar Number | Percent Gold and Silver |
| 24 | 66 |
| 25 | 73.1 |
| 26 | 64.3 |
| 27 | 62.4 |
| 28 | 57.9 |
| 29 | 53 |
| 30 | 60.2 |
| 31 | 57.7 |
| 32 | 60.9 |
| 33 | 57.9 |
| 34 | 66.7 |
| 35 | 64.1 |
| 36 | 78.5 |
| 37 | 78.5 |
| 38 | 82.8 |
| 39 | 82.9 |
| 40 | 64.9 |
| 41 | 67.1 |
| 42 | 84.7 |
| 43 | 81.3 |
| Average | 68.2% |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of decreasing the precipitation of copper in a Merrill-Crowe gold and silver recovery process which employees a cyanide leach solution comprising adding to the leach solution in a gold and silver stripping circuit a substoichiometric with respect to copper amount of ethylenediaminetetraacetic acid in combination with a scale control agent comprising a phosphonate and a polyacrylate copolymer.

2. A method of inhibiting the precipitation of copper from a pregnant cyanide leach solution including copper, gold and silver upon the addition of zinc dust comprising adding to the pregnant cyanide leach solution a substoichiometric with respect to copper amount of ethylenediaminetetraacetic acid in combination with a scale control agent comprising a phosphonate and a polyacrylate copolymer.

* * * * *